United States Patent
Savant et al.

(10) Patent No.: US 6,462,888 B2
(45) Date of Patent: Oct. 8, 2002

(54) DIFFUSER MASTER

(75) Inventors: Gajendra D. Savant, Torrance; Kevin H. Yu, Temple City; Andrew A. Kostrzewski, Garden Grove, all of CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/759,388

(22) Filed: Jan. 12, 2001

(65) Prior Publication Data

US 2001/0038492 A1 Nov. 8, 2001

Related U.S. Application Data

(62) Division of application No. 09/137,398, filed on Aug. 20, 1998, now Pat. No. 6,241,903.

(51) Int. Cl.⁷ .......................... G02B 13/20; G02B 5/02; G02B 3/02
(52) U.S. Cl. ....................... 359/707; 359/708; 359/599; 359/834
(58) Field of Search ............................... 359/707, 708, 359/599, 834

(56) References Cited

U.S. PATENT DOCUMENTS

| | | | | |
|---|---|---|---|---|
| 4,427,265 A | * | 1/1984 | Suzuki et al. ............... | 350/321 |
| 5,166,747 A | * | 11/1992 | Schroeder et al. ........... | 356/326 |
| 5,347,438 A | * | 9/1994 | Lerner ......................... | 362/186 |
| 5,422,697 A | * | 6/1995 | Ichinomiya et al. ........ | 354/274 |
| 5,839,948 A | * | 11/1998 | Krongberg ................... | 451/353 |
| 5,903,392 A | * | 5/1999 | Kojima et al. ............... | 359/599 |
| 5,982,806 A | * | 11/1999 | Yamaguchi et al. ......... | 372/103 |

* cited by examiner

Primary Examiner—Georgia Epps
Assistant Examiner—Tim Thompson
(74) Attorney, Agent, or Firm—Nilles & Nilles, S.C.

(57) ABSTRACT

A diffuser master is provided which is manufactured mechanically instead of holographically. The master can be made from a suitable substrate including relatively hard materials such as plastic, glass or metal. A substrate having a first side is worked to form a diffuser surface relief structure thereon. The substrate can be buffed using a buffing agent of a selected grit in order to form surface scratches in the first side of the substrate. The substrate can also be blasted with shot particles in order to form indentations and depressions in the first side. The substrate can alternatively be acid or alkali etched in order to form surface irregularities in the first side. The scratches, depressions or irregularities can be formed in order to create a desired surface relief and hence desired diffuser output characteristics.

8 Claims, 2 Drawing Sheets

DIFFUSER MASTER

CROSS REFERENCE TO RELATED APPLICATIONS

This application is a divisional of application Ser. No. 09/137,398, filed on Aug. 20, 1998, now U.S. Pat. No. 6,241,903.

BACKGROUND OF THE INVENTION

1. Field of the Invention

The present invention relates generally to optical elements, and more particularly to a non-Lambertian diffuser fabricated using mechanical means instead of light and mechanical methods for fabricating the diffuser.

2. Description of the Related Art

Methods for manufacturing and replicating optical components such as a master diffuser exhibiting desired light diffusing characteristics are well known. Many of these methods involve creating a master diffuser by exposing a photoresist material to a source of light and then replicating this master diffuser into one or more submasters of a more durable nature. Many of these methods inherently destroy the master diffuser when creating the submasters. There are also other methods of making replicas of a master diffuser which contain the optical features in the master without destroying the master diffuser. With each of these methods, the master diffuser is initially created optically. Submasters are created from these master diffusers utilizing a number of methods whereby the master diffuser surface is replicated into a submaster surface. These other methods are described in one or more pending U.S. applications, referenced below, which are assigned to the assignee of the present invention.

One such method involves creating a submaster for an optical product by recording optical features on a photosensitive medium using coherent or incoherent light. The photosensitive medium is then further processed to create a master optical product. A layer of two part silicone epoxy is then poured over the master to replicate the optical surface features of the master photosensitive medium in the silicone epoxy material. The silicone epoxy layer cures at room temperature and becomes rubber. The silicone material is then further cured and separated from the master to obtain a silicone rubber submaster. The soft silicone submaster is then used to make successive generations of submasters or final optical products by covering the soft submaster with a layer of epoxy, covering the layer of epoxy with a plastic substrate, curing the epoxy and separating the epoxy and plastic substrate from the submaster. This particular method of creating a diffuser is highly labor intensive, requires use of many different materials, requires performing a number of steps, and must be conducted in a sterile environment.

The specific embodiments described above regarding the rubber submaster and the silver and nickel submaster are disclosed in U.S. application Ser. No. 09/052,586, now U.S. Pat. No. 6,159,398, entitled "Method of Making Replicas While Preserving Master," commonly assigned to the assignee of the present invention.

Another method of creating a diffuser involves recording optical features in a photosensitive medium using coherent or incoherent light and then processing the medium to create a master. The photosensitive medium is then coated with a layer of silver. A layer of nickel is electroplated onto the silver layer and then the silver layer and layer of nickel are removed from the photosensitive material or medium to form the submaster. The combined silver and nickel backing form a metal shim submaster which is then replicated to fabricate final optical products by embossing the surface features of the submaster into epoxies, plastics or polycarbonate materials, or by injection molding such materials into a mold carrying the submaster. Again, this process is costly, labor intensive, wasteful of material and requires a sterile environment.

Another significant problem with each of these methods is that the submasters or final optical products created from the master optical elements are made from materials such as plastics, epoxies, or polycarbonate composites and exhibit relatively poor long-term characteristics. These materials are also not suited for use near extremely high temperature light sources because they have relatively low melting or softening temperatures when compared to other more durable materials.

Other commonly assigned U.S. patents and pending applications disclose somewhat related methods for making and recording optical products and replicating those products so that they may be mass produced. For example, U.S. Pat. No. 5,365,354 entitled "Grin Type Diffuser Based on Volume Holographic Material," U.S. Pat. No. 5,534,386 entitled "Homogenizer Formed Using Coherent Light and a Holographic Diffuser," and U.S. Pat. No. 5,609,939 entitled "Viewing Screen Formed Using Coherent Light," all owned by the present assignee relate to methods for recording and replicating optical products. Each of these U.S. patents is incorporated herein by reference for purposes including, but not limited to, indicating the background of the present invention and illustrating the state of the art.

Related U.S. patent applications include Ser. No. 08/595,307 now U.S. Pat. No. 5,956,106, entitled "LCD With Light Source Destructuring and Shaping Device," Ser. No. 08/601,133, now U.S. Pat. No. 5,838,403, entitled "Liquid Crystal Display System with Collimated Backlighting and Non-Lambertian Diffusing," Ser. No. 08/618,539, now U.S. Pat. No. 5,735,988, entitled "Method of Making Liquid Crystal Display System," Ser. No. 08/800,872, now U.S. Pat. No. 5,922,238, entitled "Method of Making Replicas and Compositions for Use Therewith," and Ser. No. 09/075,023 abandoned entitled "Method and Apparatus for Making Optical Masters Using Incoherent Light." All the above applications are owned by the present assignee and are hereby incorporated by reference for purposes including, but not limited to, indicating the background of the present invention and illustrating the state of the art. Additionally, each of these patents and applications disclose methods of making optical products wherein the methods or the products exhibit many or all of the above-noted disadvantages.

SUMMARY OF THE INVENTION

A primary object of the present invention is to provide a method for making a diffuser optical product utilizing conventional mechanical means instead of the aforementioned holographic and complex and costly methods. Another primary object of the present invention is to provide a diffuser from an extremely durable material such as glass or metal. It is another object of the present invention to provide a diffuser which is suitable for use under extreme temperature conditions such as adjacent a high temperature active light source in a liquid crystal display or the like. It is a further object of the present invention to provide a method for producing such a diffuser which requires fewer steps for creating the diffuser and is less costly in materials, cost of labor and cost of the manufacturing environment.

In accordance with the present invention, these objects are achieved by several methods for producing a diffuser from highly durable materials such as glass or metal and by the resulting diffuser optical products themselves.

In one embodiment, a method for producing such a diffuser first includes providing a substrate body having at least a first side. A working material is then selected which has desired qualities for altering the characteristics of the first side of the substrate body. The working material is applied to the first side in order to form a plurality of irregularities thereon which define a diffuser surface. The diffuser surface exhibits light propagating characteristics defined by the particular characteristics of the plurality of irregularities.

In one embodiment, the working material is a buffing agent having a desired grit. The first side of the substrate body is buffed utilizing the buffing agent which forms a plurality of scratches in the first side according to the particular grit of the agent. The scratches define the diffuser surface and thereby exhibit light propagating characteristics defined by the orientation, contour, length and depth of the plurality of irregularities.

In another embodiment, the working material is an acid or alkali agent selected to react with a particular substrate body material. The acid or alkali agent is placed on the first side of the substrate body for an etching time duration. The acid or alkali agent etches a plurality of irregularities into the first side of the substrate body. The plurality of irregularities each have at least a size, a depth, and a contour formed according to the reaction between the substrate body and the acid or alkali agent as well as etching time duration. The diffuser surface on the first side exhibits light propagation characteristics defined by the size, depth and contour of the irregularities formed by the etching or acid or alkali agent.

In another embodiment, the acid or alkali etching agent also includes a plurality of particles mixed therein each having a size, a shape and a mass. The particles enhance the etching reaction between the substrate body and the acid or alkali agent by forming deeper depressions where the particles are located on the first side of the substrate body. In another embodiment, a pressure may be applied to the first side of the substrate body while the acid or alkali agent and particles are disposed thereon to further enhance penetration of the particles into the first side of the substrate body as the acid or alkali agent reacts with the substrate body material.

In one embodiment, a mask having a plurality of openings formed therein is applied to the first side of the substrate body. The acid or alkali agent is placed on the first side over the mask and thereby etches a plurality of irregularities into the first side where the first side is exposed through the openings of the mask. The irregularities each have a size, depth and contour which are essentially determined by the length, width, orientation and shape of the plurality of openings in the mask as well as the particular reaction between the acid agent and the substrate body as well as the etching time duration.

In one embodiment, the working material is a blasting agent which includes a plurality of shot particles each having a size, a shape and a mass. The blasting agent is forced against the first side of the substrate body such as in a sandblasting operation at a predetermined velocity to form a plurality of irregularities or depressions. The depressions are formed according to the size, shape and mass of the shot particles as well as the predetermined velocity. The diffuser surface structure is defined by the depth, contour and size of the plurality of irregularities formed in the first side of the substrate body.

In another embodiment of the invention, a diffuser is disclosed having a substrate body and at least a first side. A diffuser surface relief structure formed non-holographically in the first side defines a plurality of irregularities therein. The irregularities have light propagating characteristics which are defined by at least one of the size, depth, length, width, orientation, and contour of the plurality of irregularities.

In one embodiment, the substrate body is formed from a glass material substrate. In another embodiment, the substrate body is formed from a hard plastic material substrate. In another embodiment, the substrate body is formed from a metallic material substrate.

In one embodiment, the surface relief structure is comprised of a plurality of scratches formed by buffing the first side with a buffing agent having a predetermined grit. In another embodiment, the surface relief structure is comprised of a plurality of closely spaced depressions in the first side formed by forcing a plurality of shot particles at a predetermined velocity against the first side. In a further embodiment, the surface relief structure is acid etched into the first side by an acid agent placed on the first side of the substrate body.

These and other aspects and objects of the present invention will be better appreciated and understood when considered in conjunction with the following description and accompanying drawings. It should be understood, however, that the following description, while indicating preferred embodiments of the present invention, is given by way of illustration and not of limitation. Many changes and modifications may be made within the scope of the present invention without departing from the spirit thereof and the invention includes all such modifications.

BRIEF DESCRIPTION OF THE DRAWINGS

A clear conception of the advantages and features of the present invention, and of the construction and operation of typical mechanisms provided with the present invention, will become more readily apparent by referring to exemplary and therefore non-limiting embodiments illustrated in the drawings accompanying and forming a part of this specification, and in which.

DETAILED DESCRIPTION OF THE PRESENTLY PREFERRED EMBODIMENTS

Figure 1A:
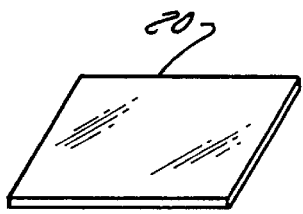
FIG. 1A illustrates an elevational perspective view of a glass diffuser constructed in accordance with one embodiment of the present invention.
Figure 1B:
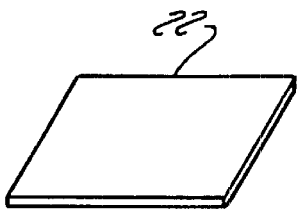
FIG. 1B illustrates an elevational perspective view of a metal diffuser constructed in accordance with another embodiment of the present invention.
Figure 1C:
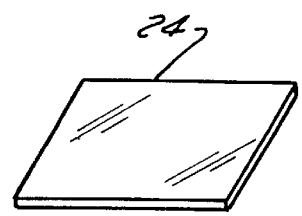
FIG. 1C illustrates an elevational perspective view of a plastic diffuser constructed in accordance with another embodiment of the present invention.

Referring now to the drawings, FIGS. 1A–1C illustrate several simplified elevational perspective views of diffusers formed by one of the methods of the present invention. The present invention may be utilized to form diffusers from substrate materials such as plastics, glass or metal. The methods are appropriate for forming diffusers from conventional diffuser materials such as epoxy, polycarbonate, polyester, acrylic, nylon, polystyrene, tetrafluoroethylene, polyimide, polyvinyl chloride, polymethyl methacrylate, TPX™, ARTON™, and other plastic materials but also may be utilized to form diffusers from much more durable materials such as glass and metal for which previous methods were not suitable. Glass materials that can be used include light barium crown, phosphate crown, crown, flint, extralight flint, light flint, fused silicon, and borosilicate. FIG. 1A illustrates a glass diffuser constructed according to one embodiment of the present invention. FIG. 1B illustrates a metal diffuser 22 constructed in accordance with one embodiment of the present invention. FIG. 1C illustrates a plastic diffuser 24 constructed in accordance with one embodiment of the present invention. The glass diffuser 20, metal diffuser 22, and plastic diffuser 24 will be described in greater detail below with reference to the processes of the invention.

Figure 2:
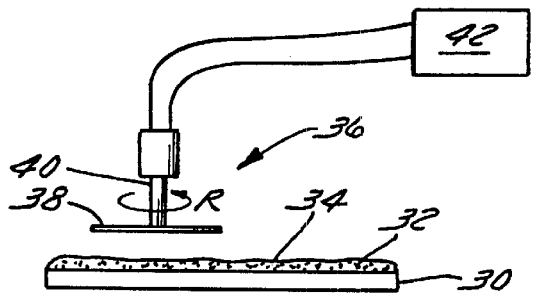
FIG. 2 illustrates a schematic view of a buffing process for forming one of the diffusers of FIGS. 1A–1C.

FIG. 2 illustrates a schematic view of a process of forming a random surface relief structure on a diffuser substrate body. The substrate body 30 includes a first side 32 onto which a diffuser surface relief structure will be formed. The substrate 30 is illustrated in the form of a flat rectangular plate and the diffusers 20, 22 and 24 are illustrated in the form of rectangles in FIGS. 1A–1C. It is intended that the diffusers and the substrate material may take on any number of configurations and constructions without departing from the scope of the present invention. The simple shapes and configurations illustrated herein are shown for simplification of description and not by way of limitation.

The substrate 30 of the present embodiment can also be in the form of a glass substrate, a metal substrate, or a plastic substrate without departing from the scope of the present invention. Depending upon the type of substrate material selected, the process shown in FIG. 2 may vary slightly in order to produce the desired surface relief structure as described below. The method of the invention is capable of forming a surface relief structure on a common material such as plastic but is also capable of forming such a surface relief structure on hard and highly durable materials such as glass and metal. Prior methods of forming diffuser surface relief structures are not capable of producing suitable surface relief structures on such hard and durable materials.

Referring again to FIG. 2, the first side 32 of the substrate 30 is facing upward although this orientation can be altered without departing from the scope of the invention. The substrate 30 can also be held in a suitable fixture (not shown) or other apparatus for affixing the substrate in place while it is being worked.

As illustrated in FIG. 2, a suitable buffing agent 34 is disposed on the first side 32 of the substrate 30. Buffing agents that can be used include agents such as aluminum oxide, silicon carbide, and cerium oxide. A buffing apparatus 36 is disposed over the substrate 30 and is utilized to work the buffing agent 34 against the first side 32 to produce scratches or other such irregularities in the substrate first side 32. Depending upon the materials selected for the substrate 30, the buffing agent is selected including a particular grit in the form of buffing particles 35 which are suspended within a compound or which are otherwise attached to the buffing apparatus 36. The buffing particles 35 are determined by the type of substrate material 30 selected.

For example, if the substrate 30 is a plastic material, the buffing agent 34 may be a buffing compound having suspended therein a plurality of buffing particles 35 in the form of sand or silica of a particular grit or size. Alternatively, the buffing agent can be in the form of what is commonly known as sandpaper which includes a paper substrate having sand or silica particles adhered thereto of a particular grit. In either case, the buffing particles must be suitable for working and abrading the surface of the relatively soft plastic substrate.

FIG. 2 illustrates that a buffing agent 34 including suspended silica particles is disposed on the first side 32 of the substrate 30. The buffing apparatus 36 includes a buffing pad 38 that is brought into contact with the buffing compound 34 and rotated or otherwise moved against the buffing compound 34. The buffing pad 38 works the buffing agent 34 including the suspended silica particles into the first side 32 to form a plurality of surface irregularities in the form of scratches and indentations in the surface. In an alternative embodiment, the buffing apparatus 36 may have a sheet or pad of sandpaper mounted to the pad 38, where the sheet includes the silica particles adhered thereto. In this embodiment, the buffing compound 34 is not necessary and is replaced by the sandpaper carried on the buffing pad 38.

FIG. 2 illustrates that the buffing pad 38 is rotated about a rotary shaft 40 in order to work the buffing agent 34 into the first side 32. The buffing pad 38 can alternatively be a surface which moves back and forth across the first side 32 in order to produce the scratches and indentations. In a further alternative, the buffing pad 38 can be connected via a mechanism (not shown) and electronic means to a computer system 42 for guiding the buffing pad 38 over the first side 32. In such an embodiment, the particular surface scratches and indentations are preprogrammed into the computer and replicated onto the first side 32 as desired.

In this embodiment, the surface irregularities, indentations or scratches are formed in the first side 32 of the substrate 30 by the silica or buffing particles of the buffing agent 34 physically cutting into the first side 32. The depth, cross-sectional contour, length and shape of the scratches depends on the direction of rotation and/or linear movement of the buffing pad 38 of the buffing apparatus 36 relative to the first side of the substrate.

If the substrate body 30 is alternatively formed from a material such as glass or a very hard plastic or a soft metal such as gold, the buffing agent 34 may include a more durable type of sand or silica particle 35 is suitable for forming scratches and indentations and otherwise deforming such hard materials. Alternatively, if the substrate material is any type of glass including extremely hard composite glass, the buffing agent 34 may include buffing particles 35 in the form of a diamond powder or diamond particles suitable for scratching or otherwise deforming such a hard surface. The type of buffing agent 34 as well as the particular construction of the buffing apparatus 36 is selected and designed according to the desired diffuser characteristics and the substrate 30 material.

Figure 3:
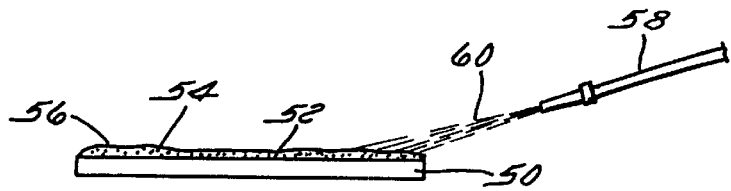
FIG. 3 illustrates a schematic view of an etching process for forming one of the diffusers illustrated in FIGS. 1A–1C.

Referring now to FIG. 3, a substrate body 50 includes a first side onto which a surface relief structure is to be formed. Again, the substrate material can be any suitable material but preferably is a metal or glass substrate material. Additionally, the substrate 50 can be supported in a suitable fixture or machine (not shown) in order to perform the process of the invention.

An acid or alkali etching agent 54, such as hydrochloric acid, hydrofluoric acid, ammonium fluoride, potassium hydroxide or sodium hydroxide is poured on or otherwise disposed over the first side 52 of the substrate 50. The etching agent 54 reacts with the substrate material and forms irregularities or depressions in the first side 52 to define the diffuser surface relief structure as is described in more detail below. The etching acid or alkali can be any type of acid or alkali that is selected to react as desired with a particular substrate material from which the substrate body 50 is manufactured. The etching acid in one preferred embodiment is a solution containing either hydrofluoric acid or ammonium fluoride. The etching alkali in one preferred embodiment is a solution containing either potassium hydroxide or sodium hydroxide. Depending on the amount of time the acid or alkali is left on the first side of the substrate and on the concentration of the acid or alkali, the etching agent 54 reacts with the first side to form the irregularities thereon. The etching acid or alkali essentially eats away at the surface of the substrate body 50 where it is located and where it is most concentrated. For example, the etching acid or alkali can be applied to the first side 52 for less than 2 minutes on a glass or metal substrate body 50 to produce the desired result.

After the desired duration of acid or alkali etching has expired, the first side 52 is washed with water or another cleaning solution in order to remove all of the remaining etching agent 54. A suitable hose 58 connected to a reservoir of water other solution 60 can be retained near the substrate 50 in order to wash the etching agent 54 from the substrate.

In the present embodiment, a plurality of solid particles 56 are suspended in the acid or alkali etching agent 54 to further enhance the etching process and to produce a more desirable surface relief structure in the first side 52 of the substrate. Alternatively, the particles can be first placed on top of the substrate body 50, such as a glass substrate, and then the etching agent 54 poured over the first side 52 and the particles 56 to produce the desired surface relief. The particles 56 enhance the surface relief structure by penetrating deeper into the first side 52 according to the mass and size of each particle and according to the chemical reaction between the etching agent 54 and the substrate body 50 beneath each particle. The greater the mass of each particle 56, the deeper the depression left beneath each particular particle.

Figure 4:
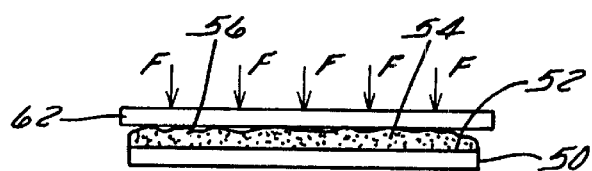
FIG. 4 illustrates an alternative etching process for forming one of the diffusers illustrated in FIGS. 1A–1C.

FIG. 4 illustrates another alternative embodiment of the acid or alkali etching process whereby a pressure plate or pressing tool 62 is placed over the first side 52 sandwiching therebetween the acid or alkali etching agent 54 and the particles 56. A force in the direction of arrows F is applied to the pressure plate or pressing tool 62 to increase penetration of the particles deeper into the first side 52. The more force applied to the plate 62, the deeper the particles 56 will embed into the first side 52 thereby enhancing the surface relief structure.

The size, shape and mass of the particular particles 56 can vary considerably depending on the desired surface relief characteristics formed in the first side 52. In one embodiment, a powder such as a ceramic powder including very fine particles can be utilized and placed on the first side 52 of the substrate body 50. The ceramic powder particles are particularly useful for etching a substrate of glass. Particular examples of suitable powder particles include silicon carbide and boron carbide. Such powder particles can either be in the form of irregular and randomly shaped particles in a range of sizes from about 4 mm to about 0.045 mm. Alternatively, particles can have a general shape of hexagonal, rhombohedral, spherical, or any other suitable shape and range in sizes from about 4 mm to about 0.045 mm. The larger the particle size, the deeper the impression made in the first side 52. Spherical particles 56 will leave essentially semi-circular or spherical depressions in the first side 52.

Figure 5A:
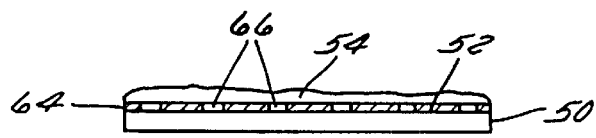
FIG. 5A illustrates another alternative etching process for forming one of the diffusers illustrated in FIGS. 1A–1C.
Figure 5B:
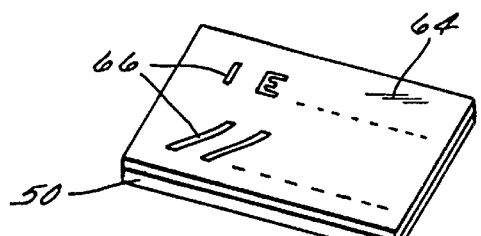
FIG. 5B illustrates a perspective view of the diffuser illustrated in FIG. 5A.

FIGS. 5A and 5B illustrate another alternative embodiment which can be utilized to etch a surface relief structure in a substrate body 50. FIG. 5B illustrates a perspective view of substrate body 50 and the mask 64. In this embodiment, a mask 64 made of a material such as polyester or polycarbonate is placed over the first side 52 of the substrate body 50. A portion of the first side 52 is exposed through a plurality of openings 66 formed in the mask 64. The openings 66 can be randomly produced in the mask or can be computer generated in order to produce a particular and predetermined surface relief structure in the substrate body 50.

In this embodiment, the etching agent 54 does not necessarily include particles 56 therein but may instead be a purely liquid solution. The etching acid solution 54 is then poured over the mask 66 and etches the first side 52 of the substrate body 50 only where exposed through the openings 66. The surface contour and configuration of the surface relief structure formed on the first side 52 is determined by the length, width, contour, spacing and shape of the openings 66 provided in the mask 64 as well as the acid concentration, duration and etching and acid and substrate compositions. Virtually any pattern of openings can be produced in the mask 64 to form any number of surface relief structures in the substrate body 50.

Figure 6:
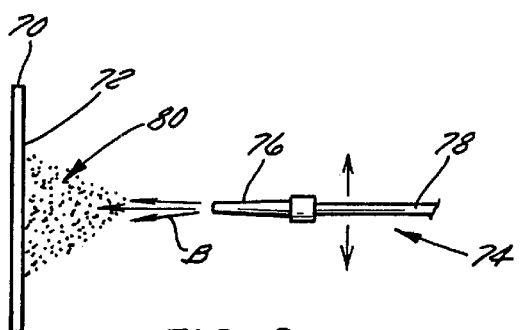
FIG. 6 illustrates a schematic view of a blasting process for forming one of the diffusers illustrated in FIGS. 1A–1C.

Referring now to FIG. 6, another alternative embodiment for producing a surface relief structure in a substrate body is disclosed. In this embodiment, a substrate body 70 is provided having a first side 72 onto which a diffuser surface relief structure is to be formed. The substrate body 70 is placed adjacent a blasting apparatus 74 having a nozzle 76 from which a blasting material is ejected at a high velocity in the direction of the arrows B toward the first side 72 of the substrate. A hose 78 is connected to a supply (not shown) of blasting material or particles 80 drawn into the hose 78 of the apparatus 74 and ejected toward the substrate. The particles 80 can be in the form of shot particles and may be provided from any number of materials such as spherical metal balls or sand or silica particles of various sizes and shapes. The particles 80 are ejected from the blasting apparatus 74 and bombard the first side 72 of the substrate. Upon impact with the substrate, the particles 80 form small depressions or pits in the first side. These depressions or pits define the surface relief structure of the diffuser created on the substrate 70. The shape, size and contour of the depressions or pits are defined by the mass, size and shape of the shot particles 80, the velocity of the particles exiting the nozzle 76, and the material which forms the particles and the substrate body 70. Additionally, the angle of incidence of the nozzle 76 relative to the first side 72 and the path of travel of the shot particles 80 relative to the first side 72 also affects the structure formed on the first side. Additionally, the size and shape of the nozzle 76 may also be varied in order to change the surface relief structure characteristics formed on the first side of the substrate.

Figure 7A:
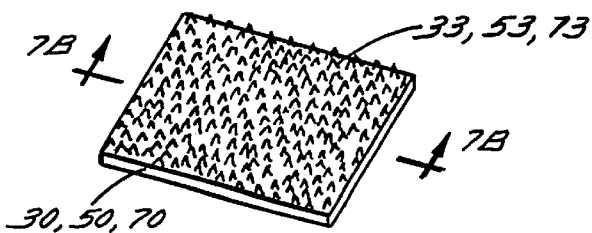
FIG. 7A illustrates an elevational plan view of the diffuser surface of a diffuser.
Figure 7B:
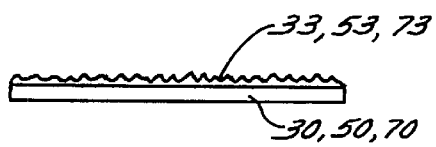
FIG. 7B illustrates a cross-sectional view of the diffuser surface taken along lines 7B—7B of FIG. 7A.

Referring now to FIG. 7A, an elevation plan view of a diffuser and a diffuser surface formed by any of the above embodiments is illustrated. The diffuser has a substrate 30, 50, or 70 and a diffuser surface 33, 53, or 73 formed by the buffing, etching, and blasting embodiments, respectively. FIG. 7B illustrates a cross-sectional view of the diffuser surface taken along lines 7B—7B of FIG. 7A.

The shape and orientation of the scratches and indentations determine the light output characteristics of the diffuser, including non-Lambertian output. For example if the scratches are long and narrow in one direction the light output from the diffuser will be a distribution which is long and narrow in the perpendicular direction. If, for example, a circular light distribution is desired, scratches or indentations of a more circular shape, such as might be achieved by pressing the buffing material into the surface in the presence of acid, are preferably used.

Though the invention was described referring to particular embodiments, many other changes and modifications may be made to the invention as described without departing from the spirit and scope thereof. The scope and spirit of these changes and modifications will become apparent from the appended claims. The scope of the invention is therefore intended only to be limited by the appended claims.

What is claimed is:

1. A non-Lambertian diffuser comprising:

a substrate body having at least a first side; and a diffuser surface relief structure formed non-holographically in the first side, the surface relief structure defining a plurality of irregularities in the first side and having light propagating characteristics defined by at least one of the size, depth, length, width, orientation, and contour of the plurality of irregularities; wherein the surface relief structure is etched into the first side by an etching agent carrying a plurality of particles each having a size, shape and mass.

2. The diffuser according to claim 1, wherein the substrate body is a glass material substrate.

3. The diffuser according to claim 1, wherein the substrate body is a plastic material substrate.

4. The diffuser according to claim 1, wherein the substrate body is a metallic material substrate.

5. The diffuser according to claim 1, wherein the surface relief structure comprises a plurality of scratches in the first side formed by buffing the first side with a buffing agent having a predetermined grit, each of the plurality of scratches having a depth, a contour, a length, a width, and a shape.

6. The diffuser according to claim 1, wherein the surface relief structure comprises a plurality of closely spaced depressions in the first side each having a depth and a contour and each formed by forcing a plurality of shot particles at a predetermined velocity against the first side, the shot particles each having a predetermined size, shape and mass.

7. The diffuser according to claim 1, wherein the surface relief structure is further etched into the first side by pressing the plurality of particles into the first side.

8. A non-Lambertian diffuser comprising:

a substrate body having at least a first side; and a diffuser surface relief structure formed non-holographically in the first side, the surface relief structure defining a plurality of irregularities in the first side and having light propagating characteristics defined by at least one of the size, depth, length, width, orientation, and contour of the plurality of irregularities; wherein the surface relief structure is further etched into the first side by an etching agent contacting the first side through a plurality of openings in a mask, the plurality of openings each having a length, a width, an orientation and a shape.

* * * * *